United States Patent [19]

DiPaola et al.

[11] Patent Number: 4,479,889

[45] Date of Patent: Oct. 30, 1984

[54] COMPOSITIONS AND METHOD FOR DEGRADING FOODSTUFFS

[75] Inventors: Vincent J. DiPaola, Elkton; William H. Collins, Timonium, both of Md.; Louis M. Sherman, Ocean City, N.J.

[73] Assignee: The United States of America as represented by the Secretary of the Army, Washington, D.C.

[21] Appl. No.: 766,333

[22] Filed: Oct. 9, 1968

[51] Int. Cl.³ .............................................. C09K 3/00
[52] U.S. Cl. ...................................... 252/365; 424/17; 424/167
[58] Field of Search .................... 424/16, 17; 252/365

[56] References Cited

U.S. PATENT DOCUMENTS

| | | | |
|---|---|---|---|
| 169,925 | 11/1875 | Steele | 424/17 |
| 1,372,092 | 3/1921 | Schroeder | 424/17 |

Primary Examiner—Benjamin R. Padgett
Assistant Examiner—Virginia B. Caress
Attorney, Agent, or Firm—Anthony T. Lane; Robert P. Gibson; Harold H. Card, Jr.

[57] ABSTRACT

A method and composition for degrading foodstuff comprising spraying said foodstuff with a physiological agent comprising a purgative, an emetic, an internal vesicant, an hallucinogen and a convulsant.

7 Claims, 2 Drawing Figures

U.S. Patent  Oct. 30, 1984  4,479,889

Fig. 1.

Contaminant disseminator

Fig. 2.

Contaminant disseminator

Launcher gun

COMPOSITIONS AND METHOD FOR DEGRADING FOODSTUFFS

This invention relates to various compositions and to a novel method for degrading stored grains and other food stocks to make them unfit for human consumption.

More particularly, the present invention deals with contaminant type agents which are utilized in novel formulations to contaminate and effectively degrade various foodstuffs in such a vivid manner that potential user will be placed on immediate notice that the foodstuffs cannot be ingested or consumed. The invention also concerns novel disseminating means that produces effective dispersion and dissemination of the present formulations in stored grains, cereals, dried fruit, etc. for the purpose of degrading them sufficiently to render them unfit for human consumption.

OBJECTIVES AND OTHER PRELIMINARY CONSIDERATIONS

Basic foods which are normally stored or cached for future use may be required under certain conditions and in the public interest to be condemned as hazardous stores and vividly labeled as unfit for use as food. Proper safeguards, of course, may be attained by immediate destruction of all suspected food stocks, although such measures as dumping and burning can be accomplished only by the use of considerable manpower or over an extended period of time. Routine labeling and safeguarding of food contents in grain elevators, storage bins, ground caches, etc. may become untenable during emergencies and inadvertently or deliberately prohibited food stocks will find their way into the hands of the populace.

In military operations, the food stores of the enemy are often seized but, because of logistical problems, they cannot be transported into friendly territory. Efforts to destroy large stores of grain by explosives or incendiaries are not generally successful. Blowing up heaps of grains succeeds in spreading the individual kernels over a wide area without actually destroying the edible part. The kernels may then be swept up and used as food. Likewise, attempts to burn stores of grains, dried cereals and fruit with gasoline, napalm, kerosene and the like produce scorched layers but the majority of the edible parts thereof is not destroyed. The contamination resulting from an incendiary may be washed off, or the smell and taste of burned kernels may not be a strong enough deterrent to certain people to refuse to ingest them.

Cached foods also play an important role in uprisings and the success of insurgents. Guerrillas must have food on which to subsist. Since grains such as wheat or rice, make up the greater portion of the food consumed daily, uprisings may be quelled by denying insurgents any access to stored grains.

In view of the foregoing, it appears highly desirable to provide effective degradation of condemned food supplies whereby the populace will sense the degradation of food supplies and will not attempt to utilize them as food in any manner. The desired degradation of foodstuffs contemplated for the present purposes should be sufficiently persistant in its effects to focus the attention of all possible users and to produce a sufficient deterrent against their use as human food.

BRIEF DESCRIPTION OF THE PRESENT INVENTION

The invention renders grains and other food stocks stored in sacks, storage bins, grain elevators, ground caches, etc. inedible by dispersing therein one or more contaminant agents of a purgative, emetic, hallucinogen or other physiological nature. The contaminant agents may be combined with suitable agents capable of labeling the contaminated foods with nauseating odors and/or taste and identifying colors as a means of forewarning the potential users that the foods are unfit for human consumption. For example, a formulation consisting of a 50/50 weight mixture of podophyllium resin, a drastic purgative, and benzyl diethyl ammonium benzoate in oil produces an extremely bitter taste in the mouth provides both the necessary warning in view of its unpleasant taste and a further deterrent by its drastic purgative action that accompanies any possible ingestion of any food that becomes contaminated with this formulation.

The present invention is of particular importance in view of the speed with which stored foodstuffs may be destroyed with minimal amounts of agent formulations and with a minimum use of manpower to accomplish this end.

"Degrading" is the generic term employed herein to refer broadly to any contamination in accordance with the invention that renders grains or other foods inedible or unfit for human ingestion and assimilation as food. The term is also used to describe contaminations that also include labeling additives or markers with characteristic odor, taste and color that place the populace on notice of such contamination.

The principal objective of the invention is to provide contaminant formulations capable of discouraging even the most foolhardy who may ignore evidence of contamination and persist in their efforts to consume any small amount of contaminated food.

In general, the compositions of the present invention comprise one or more physiological agents capable of inducing purgative, emetic, hallucenogen, internal vesicant, convulsive and similar actions in combination with such additives that may produce nauseating taste and/or odor and further, an identifying color. The ingredients are dissolved in a suitable solvent that serves as the vehicle for disseminating them throughout stored grains and similar food caches.

A general formula which may be used to indicate the function and normal concentration by weight of the various ingredients is the following:

Physiological agent: 1 to 50%
Taste additive: 5 to 20%
Odorant: 0 to 5%
Dye: 0.5 to 5%
Solvent: 50 to 90%

The above formulation is more effectively disseminated by a relatively simple device which is adapted to discharge its liquid content in accordance with the invention through a plurality of discharge pores for wide dissemination of the contaminant liquid. The device is carried and utilized more conveniently in the manner of a gun.

FURTHER DETAILS OF THE COMPOSITIONS AND CONTAMINANT METHOD

A wide variety of physiological agents are available for the practice of the present invention. In the use of purgatives, podophyllum resin dissolved in a suitable solvent, such as alcohol, acts in less than 12 hours producing watery, blood-tinged stools and marked colic. Its drastic action is noted when it is utilized even in very low concentrations of no more than 5 to 15 milligrams. Although podophyllium has a bitter taste, a more disagreeable taste results when benzyl diethyl ammonium benzoate (Bitrex) is combined with it. This compound is several magnitudes more bitter, and the bitter taste persists in the mouth for a considerable time. Rice which is contaminated with this chemical in amounts of 0.10 pound per ton is inedible. The bitter taste was so nauseating that no one who tasted the boiled rice was able to consume as much as a teaspoonful. Another purgative that may be employed for this purpose is croton oil, which in addition to stomach cramps and bowel evacuation that takes place in about 30 minutes to an hour after ingestion, is also capable of producing emesis accompanied with an irritant and vesicant action in the mouth. Croton oil is effective in amounts of about 50 to 75 milligrams and is soluble in most organic solvents including the silanes with which it may be combined to better advantage, as will be explained below.

Other agents which may be suitable for their emetic action include emetine hydrochloride, apomorphine red squill and ipecac. Agents which attack the central nervous system and cause nausea, vomiting, tremors, convulsions and similar reactions include ergot and its derivatives. Ergot is a mixture of ten peptide-type alkaloids that include lysergic acid. Taken internally, the composition reacts in about 60 minutes and causes vomiting, diarrhea, abdominal colic and hypertension. The reaction lasts up to 3 hours. It requires relatively a large dosage of about 100 milligrams.

A blend of ergot with ergonovine maleate, $C_{19}H_{23}N_3O_2$, $C_4H_4O_4$, 90/10 displays more effective reactions including nausea, vomiting, weakness, tremors and convulsions. The blend becomes effective in doses of 25 to 50 milligrams with the onset of action taking place within 20 to 60 minutes and lasting for about 3 to 6 hours. The ergot may also be blended with ergotamine tartrate, $(C_{33}H_{35}N_5O_5)_2 \cdot H_2C_4H_4O_6$, to be utilized advantageously in lesser dosages and obtain similar reactions.

Other hallucination type agents that may be used in relatively small amounts are the d-Lysergic acid derivatives which are resistant to air and light degradation. Hallucinogenic agents, such as the d-Lysergic acid diethylamide (LSD-25), is effective in dosages of 50 to 100 micrograms and are effective for about 8 to 12 hours. These agents produce a state of drunkness filled with fantasy and exaggerated images.

Since the contaminated foods may be ingested by friendly peoples, it is vitally important that the contaminant agent and the concentrations at which they are used will not be in lethal amounts. Therefore, the physiological effects and toxicity which are experienced by their use should be of a transient nature. The present agents have been found to have a safety factor of at least 20 to 1 and more often in excess of 30 to 1. "Safety factor" is the ratio based on the lethal dosage to the effective dosage. Since lethality with respect to most drugs is a question of the amount introduced in the body, the toxological level of these materials was checked in texts, such as "Dangerous Properties of Materials" by N. Irving Sax, Reinhold Publishing Co., N.Y. (1957) or was verified by actual animal tests.

Toxological tests were carried out with mice to determine lethal dosage and toxological effects. The data from these tests were then correlated to probable human tolerance in order to determine safety factors for the various chemicals and drugs disclosed herein when they are consumed by humans. These chemicals were tested by mixing 100 mg, 400 mg and 1000 mg with 25 grams of rice and 75 milliliters of water. Each mixture was boiled 25 minutes, allowed to steam for about 15 minutes and blended to liquefy it during which 100 milliliters of additional water was added to each mixture to thin it. Each of the liquefied preparations were administered orally to 20–25 gram mice on consecutive days in 0.5 ml, 1.0 ml and 2 ml doses. Results from these tests indicate that all substances disclosed herein have wide safety tolerances. Representative mice from various groups tests were autopsied and the stomach, intestines, liver and kidneys were submitted to histopathological examination. The pathologist reported no evidence of toxicity in any of the organs examined.

The amount of physiological agents that could be used to degrade foodstuffs was based on a practical limitation of about one pound of formulation to contaminate about one ton of grain. Included in this weight are the solvent, odorant and other additives. Also, the contaminated food should remain inedible for at least six months, hence the chemicals selected as suitable agents should remain relatively stable for that period of time.

Warning additives which are included in the present formulations include dyes to provide a visual label of the contamination. Further warnings to prevent ingestion may be based on malodorant materials, such as mercaptans, valeric, capric and other fatty acids.

Grains, such as rice kernels, may be treated with silanes, as noted previously, to produce a degraded grain that cannot be cooked and used for food. Silanes are highly reactive chemicals that react with any moisture or hydroxyl (OH) groups in the kernel structure. A grain crop, such as rice, which has 12 to 15% moisture in the kernel and hydroxyl groups in both the husk and kernel, may be readily reacted with a silane. The reactions of a typical silane, trimethylchlorosilane, with water and with materials having OH groups in its structure are as follows:

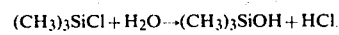
$(CH_3)_3SiCl + H_2O \rightarrow (CH_3)_3SiOH + HCl$

$(CH_3)_3SiCl + R-OH \rightarrow Si(CH_3)_3 + R-O + HCl$

In both of these reactions the hydrochloric acid formed imparts a sour taste and is also capable of reacting with the rice structure. The contaminated rice turns various colors depending upon the particular silane and concentration used in the reaction. The kernels become sticky and gummy and emit a very disagreeable odor. Husked rice which has been treated with a silane cannot be cooked successfully. The rice will not expand or absorb water in the normal manner but remains approximately the same size as the uncooked grain. It has a soft mushy texture. The silane appears to react with the rice material to form a water-resistant coating which prevents water absorption into the grain even after prolonged boiling.

The following preferred formulations are presented by way of illustration showing the ingredients and their concentration in weight percents. The examples are not to be construed as limiting in any way in the practice of the present invention.

EXAMPLE I

| | |
|---|---|
| Podophyllum resin | 15% |
| Benzyl diethyl ammonium benzoate | 15% |
| Fuchsin Dye | 2% |
| Ethanol | 68% |

EXAMPLE II

| | |
|---|---|
| Benzyl diethyl ammonium benzoate | 10% |
| Methylene blue | 2% |
| Methyl trichlorosilane | 50% |
| Methylene Chloride | 38% |

EXAMPLE III

| | |
|---|---|
| Ergot/ergonovine maleate (90/10 by wt) | 15% |
| Benzyl diethyl ammonium benzoate | 15% |
| Valeric acid | 5% |
| Indigo carmine | 2% |
| Methanol | 63% |

EXAMPLE IV

| | |
|---|---|
| Croton oil | 45% |
| Valeric acid | 7% |
| Calco red dye | 3% |
| Carbon tetrachloride | 45% |

EXAMPLE V

| | |
|---|---|
| Croton oil | 10% |
| Benzyl diethyl ammonium benzoate | 5% |
| Calco red oil dye | 2% |
| Mercaptate E-12* | 5% |
| Stoddard solvent | 23% |
| Silane | 55% |

*Mercaptate E-12 is a mercaptan manufactured by Carlisle Chemical Company. It is dissolved in the stoddard solvent before the addition of the silane.

DISSEMINATOR DEVICE AND MODE OF OPERATION

Various approaches and devices may be used to disseminate the present compositions. An effective contaminant disseminator device which may be used to degrade a ton of grain is shown in the accompanying drawing in which:

FIG. 1 is a side elevation partly in section showing the contaminant disseminator; and FIG. 2 is a perspective view showing the initiator housing attached to the disseminator device of FIG. 1.

In the drawing, a cylindrical container 11 is provided with a perforated nozzle 12 at the front having a threaded section 14 for screwing into the body of the container. A thin flexible closure 13 of aluminum foil or the like is secured in fluid-tight relationship against the nozzle and retains the liquid 18 within said container. An annular seal 15 inserted between said container and said nozzle prevents seepage of liquid from around the threaded closure. The nozzle is provided with a series of frontal pores 16 and radial pores 17 along its lateral edge.

A piston member 19 in the shape of a cup has radial ring 21 (one shown) on its periphery. Radial seals 22 provide a fluid-tight relationship with the container wall. A propellant charge 23 fills the space behind said piston member. The rear portion of container 11 is adapted with a hollow threaded stem 25. A primer composition 24 is placed inside said hollow stem.

In FIG. 2, the disseminator is screwed into a launcher gun which contains the striker mechanism (not shown). The launcher gun is a well known device in the part and need not be illustrated or described in detail. To operate the disseminator device, the gun is cocked by pulling trigger lever 26 back in slot 27 and retained within seat 28. When the trigger is released, the striker pin fires the primer 24 which in turn ignites the propellant charge 23. The explosion of the propellant drives piston 21 down the chamber forcing the liquid ahead of it and shearing the aluminum disk 13, and forcing the contaminant liquid out of the nozzle pores. An M39 primer and 175 mg black powder provide optimum balance of liquid discharge and dissemination.

Although actual operation of the device is simple, the geometry and size of the grain cache determines the sites for disseminating the contaminant liquid. A typical one ton cache which has nominal dimensions of 4 feet wide, 4 feet long and a depth of 2 feet requires that each disseminator be inserted approximately 8 to 12 inches from each corner to a depth of about 2 to 4 inches. The launcher gun is then fired. The entire operation including liquid coating of the surface, should be accomplished within 2 minutes. On larger caches, additional disseminators would be used. As a guideline, one disseminator container 6 inches long and one inch in diameter may be used to contaminate up to 500 pounds of rice. Therefore, if two tons of rice are to be degraded, eight disseminators will be required. On small caches of grain of about 200 to 600 pounds in size, a single disseminator should be sufficient. For grains under 100 pounds or in bags, the contents are preferably dumped on the ground and contaminant liquid is poured over them. The disseminator should be inserted to a depth of about 4 inches before initiating.

It will be apparent from the foregoing that various stores of foodstuffs may be rendered unfit for human consumption by contaminating them with formulations containing physiological agents and deterrent additives in accordance with this invention.

The invention is not limited to the above specific examples which have been offered merely as illustrations, since reasonable modifications and variations may be made without departing from the spirit and scope of the invention.

What is claimed is:

1. A composition for degrading foodstuffs which consists essentially of the following components in the percent by weight indicated:
    (a) a physiological agent selected from the group consisting of a podophyllum resin, croton oil, emetine hydrochloride, ergot, ergonovine maleate, ergotamine tartrate and d-Lysergic acid diethylamide and a mixture thereof, in an amount in the range of about 1 to 50 percent,
    (b) benzyl diethyl ammonium benzoate in an amount in the range of about 5 to 20 percent,
    (c) a malodorant selected from the group consisting of a mercaptan and a fatty acid having a chain of about 5 to 12 carbon atoms in an amount in the range of 0.0 to 5.0 percent, (d) a dye selected from the group consisting of fuchsin, methylene blue, indigo carmine and calco red in an amount in the range of 0.5 to 5.0 percent, and
(e) a solvent vehicle in an amount in the range of 50 to 90 percent.

2. A composition in accordance with claim 1 wherein the physiological agent consists of croton oil.

3. A composition in accordance with claim 1 consisting of the following components in the percent by weight indicated:

| | |
|---|---|
| podophyllum resin | 15% |
| benzyl diethyl ammonium benzoate | 15% |
| fushsin dye | 2% |
| ethanol | 68% |

4. A composition in accordance with claim 1 wherein the physiological agent is a mixture consisting essentially of about 90 percent ergot and about 10 percent ergonovine maleate by weight.

5. A composition in accordance with claim 1 consisting of the following components in the percent by weight indicated:

| | |
|---|---|
| ergot/ergonovine maleate (90/10 by wt) | 15% |
| benzyl diethyl ammonium benzoate | 15% |
| valeric acid | 5% |
| indigo carmine | 2% |
| methanol | 63% |

6. A composition for degrading foodstuffs which consists essentially of the following components in the percent by weight indicated:
(a) a physiological agent selected from the group consisting of a podophyllum resin, croton oil, emetine hydrochloride, ergot, ergonovine maleate, ergotamine tartrate and d-Lysergic acid diethylamide and a mixture thereof in an amount in the range of 1 to 50 percent,
(b) benzyl diethyl ammonium in an amount in the range of about 5 to 20 percent,
(c) a malodorant selected from the group consisting of a mercaptan and a fatty acid having a chain of about 5 to 12 carbon atoms in an amount in the range of 0.0 to 5.0 percent,
(d) a dye selected from the group consisting of fuchsin, methylene blue, indigo carmine and calco red in an amount of 0.5 to 5 percent,
(e) a solvent vehicle, and
(f) a silane selected from the group consisting of methyl trichlorosilane and trimethylchlorosilane in an amount in the range of 45 to 60 percent.

7. A composition in accordance with claim 6 consisting of the following components in the percent by weight indicated:

| | |
|---|---|
| croton oil | 10% |
| benzyl diethyl ammonium benzoate | 5% |
| calco red oil dye | 2% |
| mercaptan | 5% |
| solvent | 23% |
| silane | 55% |

* * * * *